United States Patent [19]
Ukai et al.

[11] Patent Number: 6,131,840
[45] Date of Patent: Oct. 17, 2000

[54] MECHANISM FOR PREVENTING UNEVEN TAKE-UP OF TAPE

[75] Inventors: Hirataka Ukai; Masaru Ohshita, both of Kawasaki; Yasuo Shibata, Tokyo, all of Japan

[73] Assignees: Fujitsu Limited, Kawasaki; Copal Company Limited, Tokyo, both of Japan

[21] Appl. No.: 08/332,650

[22] Filed: Nov. 1, 1994

Related U.S. Application Data

[63] Continuation of application No. 07/983,419, Nov. 30, 1992, abandoned.

[30] Foreign Application Priority Data

Nov. 28, 1991 [JP] Japan ................................. 3-315009

[51] Int. Cl.[7] .................................................. G03B 1/04
[52] U.S. Cl. ........................................................... 242/324
[58] Field of Search ............................... 242/76, 67.1 R, 242/195, 65, 332.8, 346.1, 547

[56] References Cited

U.S. PATENT DOCUMENTS

| 3,768,717 | 10/1973 | Salcedo | 242/76 |
|---|---|---|---|
| 4,580,738 | 4/1986 | Scheer | 242/76 |
| 4,932,600 | 6/1990 | Ushi et al. | 242/76 |
| 5,005,748 | 4/1991 | Kim | 242/76 |
| 5,050,028 | 9/1991 | Schandl | 242/76 |
| 5,087,318 | 2/1992 | Anderson | 242/76 |

*Primary Examiner*—Lynne H. Browne
*Attorney, Agent, or Firm*—Greer, Burns & Crain, Ltd.

[57] ABSTRACT

A mechanism prevents uneven take-up of a tape on a take-up reel. This mechanism includes a roller guide having a first flange for guiding a first edge of the tape so as to position the tape in a direction perpendicular to a transport direction of the tape, and an arm roller which pushes against a part in a vicinity of a second edge of the tape which is taken up on the take-up reel, where the second edge is opposite to the first edge.

15 Claims, 5 Drawing Sheets

MECHANISM FOR PREVENTING UNEVEN TAKE-UP OF TAPE

RELATED APPLICATION

This is a continuation of application Ser. No. 07/983,419, filed on Nov. 30, 1992 now abandoned.

BACKGROUND OF THE INVENTION

The present invention generally relates to mechanisms for preventing uneven take-up of tape, and more particularly to a mechanism for preventing uneven take-up of tape in a magnetic tape unit.

Recently, the size of magnetic tape units has been reduced considerably, and it has become impossible to provide a long tape path for the purpose of stabilizing the tape transport. For this reason, it has become necessary to provide a mechanism for preventing uneven take-up of tape to guarantee stable tape transport.

FIG. 1 shows an example of a mechanism for preventing uneven take-up of tape (hereinafter simply referred to as an uneven tape take-up preventing mechanism) of a conventional magnetic tape unit in a plan view, and FIG. 2 shows a side view of the uneven tape take-up preventing mechanism when viewed in a direction A in FIG. 1.

In FIGS. 1 and 2, a take-up reel 1 for taking up a tape 2, and a roller guide 3 are shown. The roller guide 3 is provided with a lower flange 5 which is fixed on the lower side thereof, and an upper flange 4 which is provided on the upper side thereof. This upper flange 4 is movable along the axis direction of the roller guide 3, and is urged towards the lower flange 5 by a spring (not shown). The top edge of the tape 2 is pushed by the upper flange 4 and the lower edge of the tape 2 slides against the lower flange, so that the tape 2 is positioned in a direction perpendicular to a transport direction of the tape 2.

A base part of an arm 6 is pivotally supported on a magnetic tape unit body. A spring 7 is fit around a rotary shaft of the arm 6. One end of this spring 7 is fixed to the magnetic tape unit body, and the other end of this spring 7 is fixed to the arm 6. Hence, a free tip end of the arm 6 is urged to pivot towards the take-up reel 1. An arm roller 8 is rotatably supported on the tip end of the arm 6. The arm roller 8 has a contact region 8a which makes contact with approximately the central part of the tape 2 which is taken up on the take-up reel 1, so as to prevent uneven take-up of the tape 2 by the take-up reel 1.

Next, a description will be given of the uneven tape take-up preventing mechanism having the above described construction.

As described above, the arm roller contact region 8a, which is rotatably provided on the tip end of the arm 6, makes contact with the tape 2, which is taken up on the take-up reel 1, by the action of the spring 7. As a result, the tape 2 which is taken up on the take-up reel 1 is prevented from moving in a direction perpendicular to the transport direction of the tape 2, and it is possible to evenly take up the tape 2 on the take-up reel 1.

However, when the tape 2 is taken up on the take-up reel 1, air is also taken up with the tape 2. For this reason, when the tape 2 is taken up on the take-up reel 1 together with the air, the air is pushed out in the direction (up and down in FIG. 2) perpendicular to the transport direction of the tape 2 because the contact region 8a of arm roller 8 pushes against approximately the central part of the tape 2 which is taken up on the take-up reel 1.

If the force of the spring which urges the upper flange 4 of the roller guide 3 downwards in FIG. 2 is relatively small, the tape 2 moves up against the force exerted by this spring due to the escaping air. This upward movement causes uneven take-up of the tape 2 on the take-up reel 1.

On the other hand, if the force of the spring 7 is relatively small, the tape 2 also moves up and down, that is, in the direction perpendicular to the transport direction of the tape 2, due to the escaping air. This up and down movement of the tape 2 also causes uneven take-up of the tape 2 on the take-up reel 1.

Therefore, in order to prevent the uneven take-up of tape, it is necessary to set the forces exerted by the spring of the roller guide 3 and/or the spring 7 to relatively large values. However, if the pushing force of the upper flange 4 is large, the top edge of the tape 2 can easily be damaged. Furthermore, if the pushing force of the arm roller 8 on the tape 2 is large, a mark formed by the roller arm 8 may remain on the back surface of the tape 2, resulting in another problem.

SUMMARY OF THE INVENTION

Accordingly, it is a general object of the present invention to provide a novel and useful uneven tape take-up preventing mechanism in which the problems described above are eliminated.

Another and more specific object of the present invention is to provide an uneven tape take-up preventing mechanism for preventing uneven take-up of a tape on a take-up reel, which includes: a roller guide having a first flange for guiding a first edge of the tape so as to position the tape in a direction perpendicular to a transport direction of the tape; and an arm roller which pushes against a part in a vicinity of a second edge of the tape which is taken up on the take-up reel, where the second edge is opposite to the first edge. According to the uneven tape take-up preventing mechanism of the present invention, it is possible to stably and smoothly take up the tape on the take-up reel, without damaging and without introducing uneven take-up of tape.

Other objects and further features of the present invention will be apparent from the following detailed description when read in conjunction with the accompanying drawings.

DESCRIPTION OF THE PREFERRED EMBODIMENTS

First, a description will be given of the operating principle of the present invention, by referring to FIG. 3.

Figure 1:
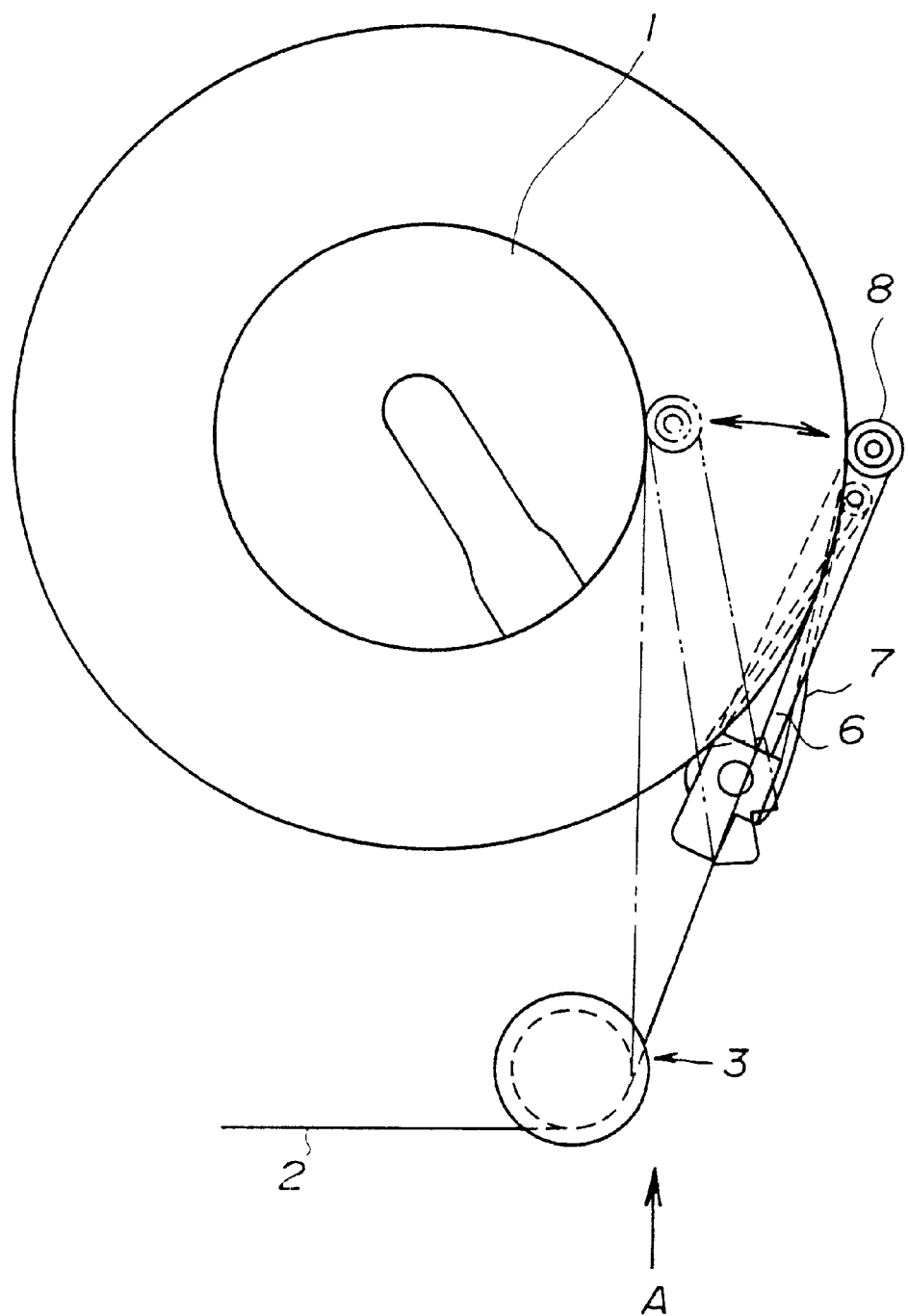
FIG. 1 is a plan view showing an example of an uneven tape take-up preventing mechanism of a conventional magnetic tape unit.
Figure 2:
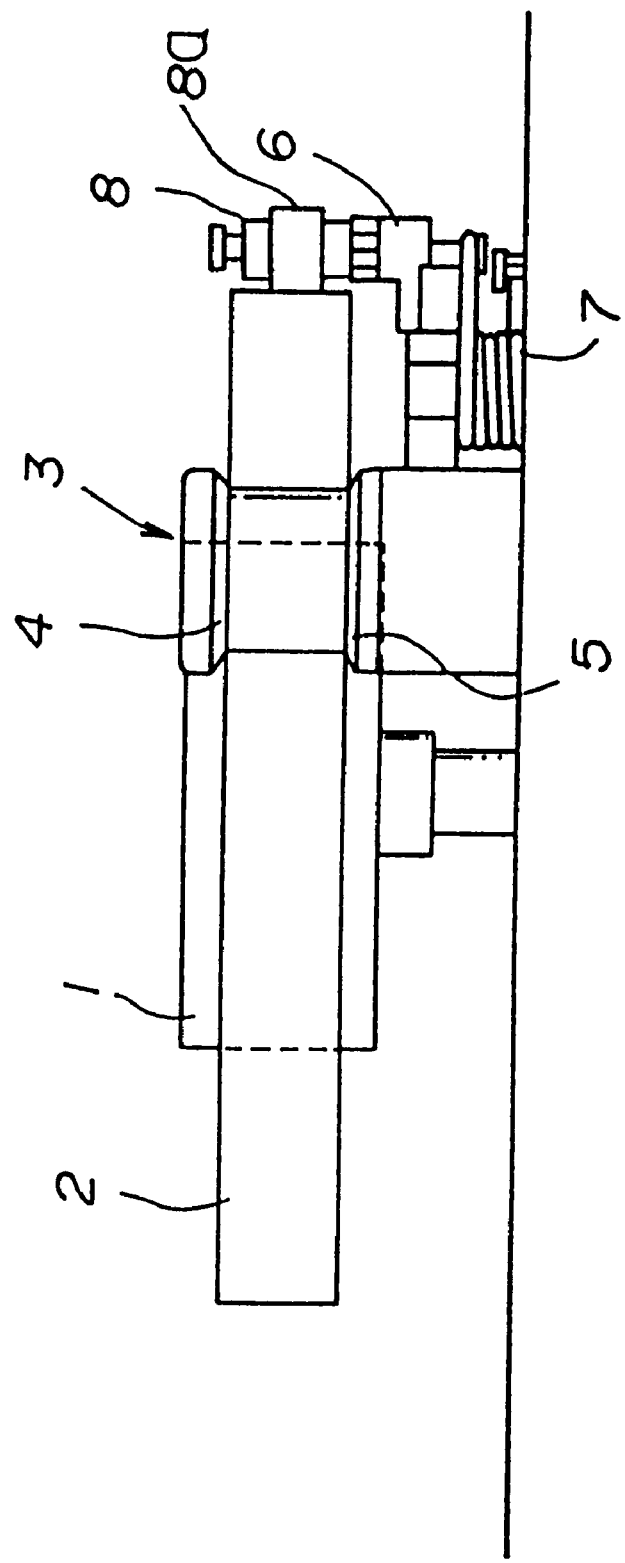
FIG. 2 is a side view showing an essential part of the uneven tape take-up preventing mechanism when viewed in a direction A in FIG. 1.
Figure 3:
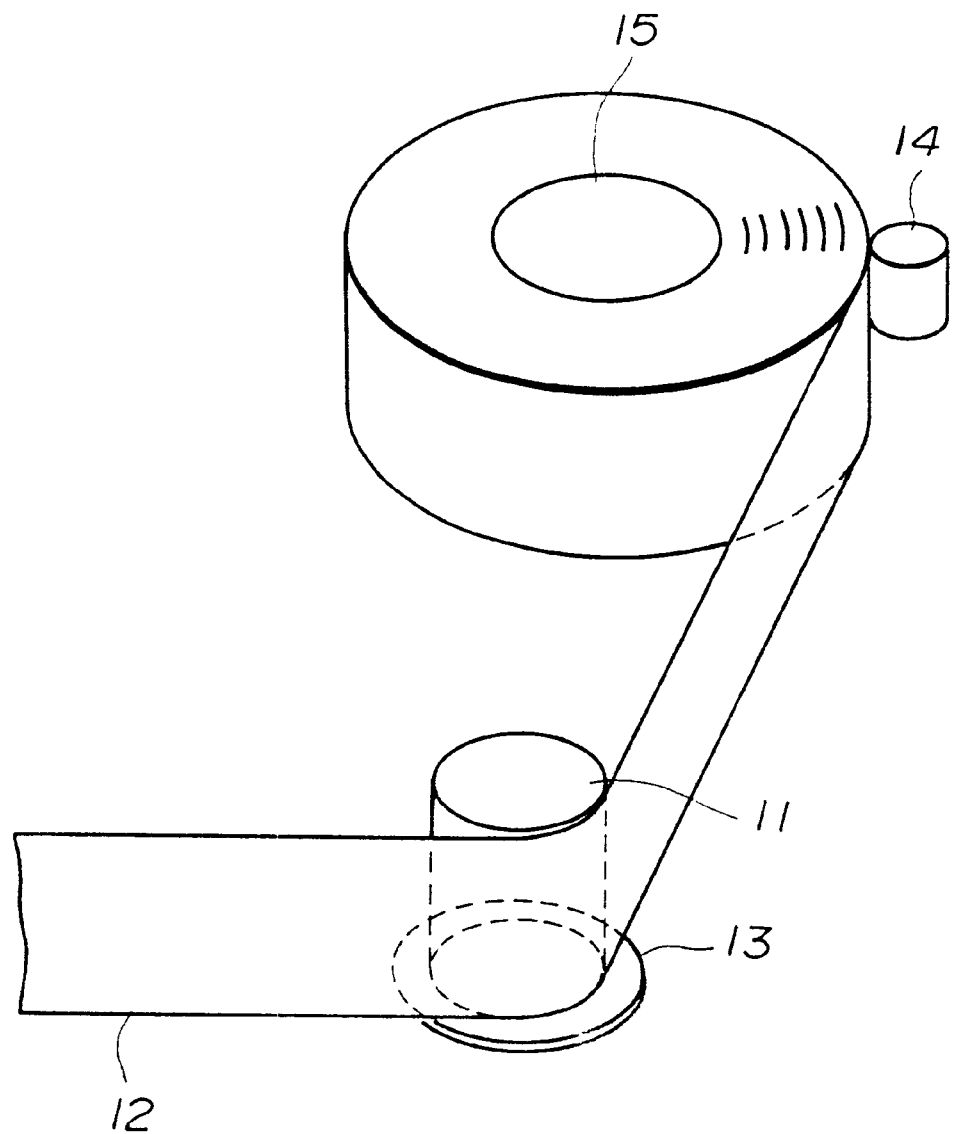
FIG. 3 is a perspective view for explaining the operating principle of the present invention.

In FIG. 3, a roller guide 11 has a flange 13 for guiding one edge of a tape 12 which makes sliding contact with the roller guide 11. For the sake of convenience, the flange 13 is shown in FIG. 3 as being provided on the lower side of the roller guide 11 to guide the bottom edge of the tape 12. The flange 13 is provided on the circumferential surface of the roller guide 11, and positions the tape in a direction perpendicular to a transport direction of the tape 12.

The tape 12 is taken up on a take-up reel 15. An arm roller 14 pushes against the tape 12 which is taken up on the take-up reel 15, so as to prevent uneven take-up of the tape 12. The arm roller 14 is arranged so as to push in the vicinity of an edge of the tape 12, opposite the edge guided by the flange 13. For the sake of convenience, FIG. 3 shows an example where the arm roller 14 pushes the vicinity of the top edge of the tape 12.

In the uneven tape take-up preventing mechanism of the present invention shown in FIG. 3, the arm roller 14 pushes in the vicinity of the upper edge of the tape 12. For this reason, the air which is taken up with the tape 12 as the tape 12 is taken up on the take-up reel 15 escapes from the bottom edge of the tape 12. In this case, the tape 12 would tend to move downwardly, but this downward movement of the tape 12 is prevented by the flange 13 of the roller guide 11. Therefore, the tape 12 can be taken up smoothly on the take-up reel 15, even if the pushing force of the arm roller 14 is relatively small, and it is possible to prevent uneven take-up of the tape 12.

Figure 4:
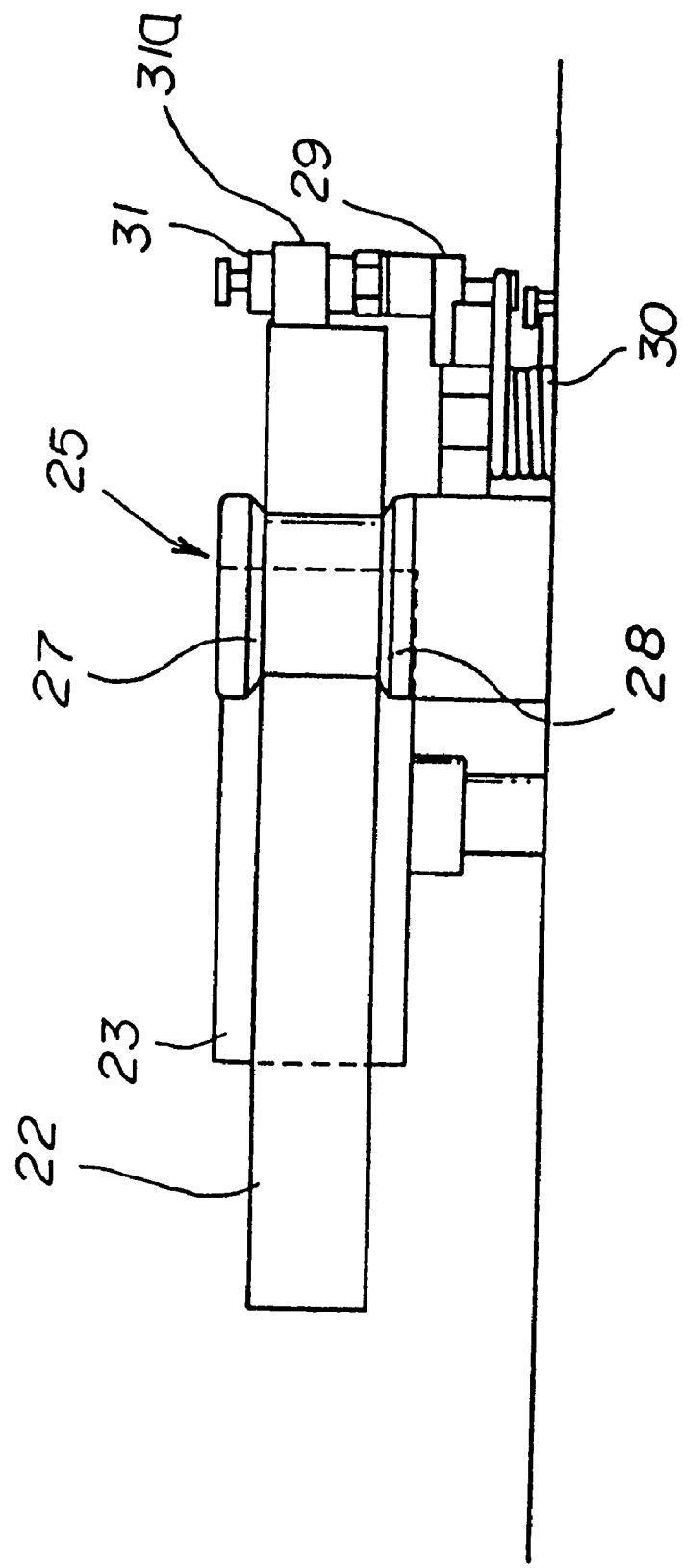
FIG. 4 is a side view showing an essential part of an embodiment of an uneven tape take-up preventing mechanism according to the present invention.

Next, a description will be given of an embodiment of the uneven tape take-up preventing mechanism according to the present invention, by referring to FIGS. 4 and 5. FIG. 4 shows a side view of this embodiment when viewed in a direction B in FIG. 5, and FIG. 5 shows a plan view of this embodiment.

Figure 5:
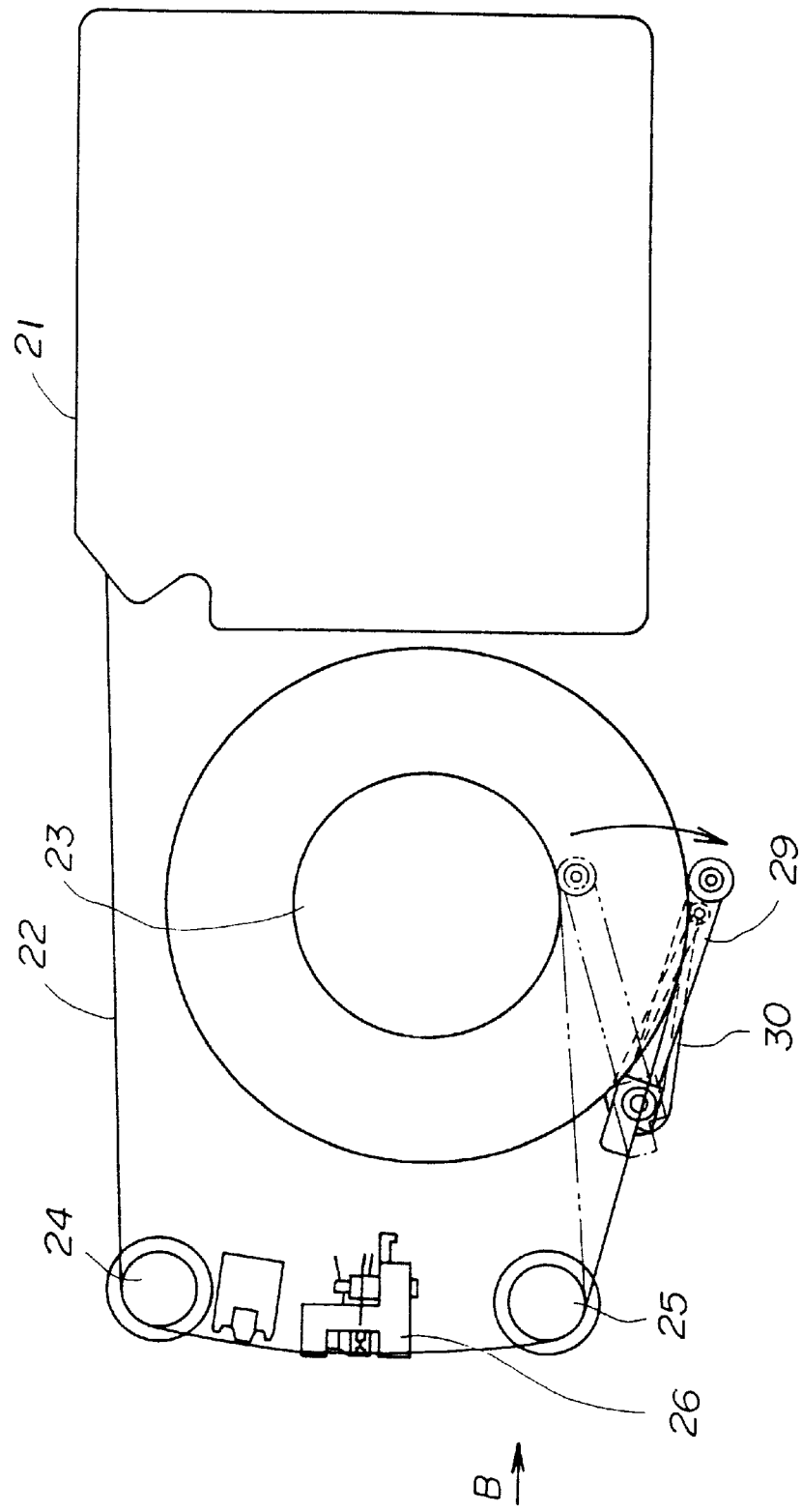
FIG. 5 is a plan view showing the embodiment of the uneven tape take-up preventing mechanism according to the present invention.

In FIG. 5, a magnetic tape 22 which is accommodated within a cartridge 21 is taken up on a take-up reel 23 via a threading mechanism (not shown). The tape 22 before being taken up on the take-up reel 23 makes sliding contact with a first roller guide 24, a magnetic head 26, and a second roller guide 25. The magnetic head 26 is provided between the first and second roller guides 24 and 25, and reads/writes data from/to the tape 22.

A description will be given of this embodiment, by referring particularly to FIG. 4. The second roller guide 25 has a lower flange 28 fixed to the lower side thereof, and an upper flange 27 which is provided on the upper side thereof. This upper flange 27 is movable in the axis direction of the second roller guide 25, and is urged towards the lower flange 28 by the action of a spring (not shown). For example, the spring of the second roller guide 25 is made up of a coil spring which is provided within the second roller guide 25 and has ends thereof respectively connected to the upper and lower flanges 27 and 28. The upper flange 27 pushes against the top edge of the tape 22, and the bottom edge of the tape 22 makes sliding contact with the fixed lower flange 28 of the second roller guide 25. Hence, the tape 22 is positioned in a direction perpendicular to the transport direction of the tape 22.

A base end of an arm 29 is pivotally supported 15 on a magnetic tape unit body. A spring 30 is fitted around a rotary shaft of the arm 29. One end of the spring 30 is fixed to the magnetic tape unit body, and the other end of the spring 30 is fixed to the arm 29. Hence, a free tip end of the arm 29 is urged to pivot towards the take-up reel 23 by the action of the spring 30.

An arm roller 31 is rotatably supported on the tip end of the arm 29. The arm roller 31 has a contact region 31a makes contact with the top edge of the tape 22 which is taken up on the take-up reel 23, so as to prevent uneven take-up of the tape 22 by the take-up reel 23.

The take-up reel 23 is rotated by a reel motor (not shown) in a known manner. When the take-up reel 23 rotates, the tape 22 is dispensed from the cartridge 21 and is taken up on the take-up reel 23 via a tape path which includes the first roller guide 24, the magnetic head 26 and the second roller guide 25. The tape 22 makes sliding contact with the first roller guide 24, the magnetic head 26 and the second roller guide 25, and information is read/written from/to the tape 22 by the magnetic head 26.

The arm roller contact region 31a pushes against the vicinity of the top edge of the tape 22. Hence, when the tape 22 is taken up on the take-up reel 23, the air which is taken up with the tape 22 can escape from the bottom edge part of the tape 22. In this state, the tape 22 tends to move downwardly, but the lower flange 28 of the second roller guide 25 prohibits the downward movement of the tape 22. As a result, even if the pushing force of the arm roller contact region 31a is relatively small, the tape 22 is stably taken up on the take-up reel 23, and an uneven take-up of the tape 22 will not occur.

In the described embodiment, the second roller guide 25 guides the bottom edge of the tape 22 by the lower flange 28, and the arm roller contact region 31a pushes the top edge part of the tape 22. However, it is possible to urge a lower flange 28 upwardly towards a vertically fixed upper flange 27 by the action of a spring, guide the top edge of the tape 22 by the fixed upper flange 27, and push the bottom edge part of the tape 22 by the arm roller 31.

Further, the present invention is not limited to these embodiments, but various variations and modifications may be made without departing from the scope of the present invention.

What is claimed is:

1. A mechanism for preventing uneven take-up of a tape on a take-up reel, the tape having a first edge and a second edge opposite to the first edge, said mechanism comprising:

a roller guide having a first flange, said first flange guiding the first edge of the tape so as to position the tape in a direction perpendicular to a transport direction of the tape; and an arm roller having a contact region which pushes against the second edge of the tape, and the take-up reel without pushing against the first edge of the tape, whereby air which is taken up with the tare as the tape is taken up on the take-up reel escapes from the first edge of the tape.

2. The mechanism as claimed in claim 1, wherein the first flange is fixed.

3. The mechanism as claimed in claim 1, wherein said roller guide further has a second flange for guiding the second edge of the tape.

4. The mechanism as claimed in claim 3, wherein the first flange of said roller guide is fixed, and the second flange of said roller guide is movable and is normally urged towards the first flange.

5. The mechanism as claimed in claim 1, wherein the first and second edges of the tape respectively are top and bottom edges of the tape.

6. The mechanism as claimed in claim 1, wherein the first and second edges of the tape respectively are bottom and top edges of the tape.

7. The mechanism as claimed in claim 1, which further comprises a spring-loaded arm which has a base end which is pivotally supported and a free tip end which is normally urged towards the take-up reel, and said arm roller is rotatably provided on the tip end of said spring-loaded arm.

8. The mechanism as claimed in claim 7, wherein the first and second edges of the tape respectively are bottom and top edges of the tape.

9. The mechanism as claimed in claim 7, wherein said spring-loaded arm is arranged on a downstream side of said roller guide along the transport direction of the tape which is taken up on the take-up reel.

10. A mechanism for preventing uneven take-up of a tape on a take-up reel, said tape having a first edge, a second edge opposite to the first edge, an imaginary center line extending parallel to the first and second edges, and a region adjacent the second edge and closer to the second edge than the first edge relative to the imaginary center line, said mechanism comprising:

a roller guide having a first flange, said first flange guiding the first edge of the tape so as to position the tape in a direction perpendicular to a transport direction of the tape; and an arm roller having a contact region which pushes against the region of the tape adjacent the second edge of the tape and the take-up reel without pushing against the first edge of the tape, whereby air which is taken up with the tape as the tape is taken up on the take-up-reel escapes via the first edge of the tape.

11. The mechanism as claimed in claim 10, wherein the first flange is fixed.

12. The mechanism as claimed in claim 10, wherein said roller guide further has a second flange for guiding the second edge of the tape.

13. The mechanism as claimed in claim 12, wherein the first flange of said roller guide is fixed, and the second flange of said roller guide is movable and is normally urged towards the first flange.

14. The mechanism as claimed in claim 10, which further comprises a spring-loaded arm having a base end which is pivotally supported and a free tip end which is normally urged towards the take-up reel, said arm roller being rotatably provided on the tip end of said spring-loaded arm.

15. The mechanism as claimed in claim 14, wherein said first and second edges of the tape respectively are bottom and top edges of the tape, and said spring-loaded arm is arranged on a downstream side of said roller guide along the transport direction of the tape which is taken up on the take-up reel.

\* \* \* \* \*